United States Patent [19]
Denisevich, Jr.

[11] Patent Number: 4,505,844
[45] Date of Patent: Mar. 19, 1985

[54] P-TYPE POLYPHENOXAZINE ELECTROACTIVE POLYMERS

[75] Inventor: Peter Denisevich, Jr., El Cerrito, Calif.

[73] Assignee: Chevron Research Company, San Francisco, Calif.

[21] Appl. No.: 442,400

[22] Filed: Nov. 17, 1982

[51] Int. Cl.³ .............................................. H01B 1/00
[52] U.S. Cl. ................................... 252/500; 252/512; 252/518; 528/183; 528/210; 528/342; 528/363; 528/374
[58] Field of Search ............... 528/363, 183, 210, 342, 528/374; 252/500, 510, 518, 512

[56] References Cited
U.S. PATENT DOCUMENTS

| | | | |
|---|---|---|---|
| 3,966,987 | 6/1976 | Suzuki et al. | 252/500 |
| 4,344,869 | 8/1982 | Blinne et al. | 252/500 |
| 4,344,870 | 8/1982 | Blinne et al. | 252/500 |
| 4,360,644 | 11/1982 | Naarman et al. | 252/500 |
| 4,375,427 | 3/1983 | Miller et al. | 252/500 |

Primary Examiner—Lester L. Lee
Attorney, Agent, or Firm—S. R. LaPaglia; E. J. Keeling; A. Stephen Zavell

[57] ABSTRACT

P-type electroactive polymers comprising recurring diradical units of substituted or unsubstituted polyphenoxazine and an electron acceptor dopant associated therewith.

20 Claims, No Drawings

P-TYPE POLYPHENOXAZINE ELECTROACTIVE POLYMERS

BACKGROUND OF THE INVENTION

This invention relates to electroactive organic polymeric materials. More specifically, this invention relates to associating electroactivating agents known in the art as dopants with an organic polymer.

Recently, research has been conducted into organic polymeric materials in order to modify their room temperature electrical conductivity by reacting them with electron donor or acceptor molecules. The electron donor or acceptor molecules, generally known in the art as n-type and p-type dopants respectively, can transform the organic polymeric materials so that these modified organic polymeric materials exhibit semiconducting and metallic room temperature electrical conductivity. Polyacetylene is an example of an organic polymeric material whose room temperature electrical conductivity can be modified over several orders of magnitude above its insulator state, by the incorporation of dopant molecules, A. J. Heeger et al, U.S. Pat. No. 4,222,903, said patent incorporated herein by reference. Other examples of organic polymeric materials whose room temperature electrical conductivity can be enhanced by several orders of magnitude over their insulator state by means of incorporation of dopant molecules are poly-p-phenylene, polypyrrole, poly-1,6 heptadiyne, and polyphenylene vinylene. However, all of the above recited examples are of organic polymeric materials which are completely insoluble or infusible and hence are completely intractable.

Other examples of organic polymers whose room temperature electrical conductivity can be modified with the aid of dopants are polyphenylene sulfide and poly-m-phenylene. However, the above recited materials though being tractable in their original virgin state, undergo irreversible chemistry when reacted with dopants which modify their room temperature electrical conductivity. This irreversible chemistry imparts upon these dopant modified organic polymeric materials a state of intractability. Upon removal of the doping agents, these materials do not revert to the chemical structure which they originally exhibited prior to being modified by the dopants. The inorganic material polysulfur nitride is also considered a polymeric conductor. As with the previously recited polymeric materials, polysulfur nitride is also completely intractable.

For use in a wide variety of electronic device applications, it is highly desirable to have available organic polymeric electrically conducting materials having a preselected room temperature conductivity which can be varied over a broad range. This range should preferably extend from the insulator state of the unmodified organic polymeric material through the semiconducting regime and extending into the highly conducting metallic state. It is also desirable that these organic polymeric electrically conducting materials should be tractable and hence processable so that useful articles of any desired shape and size can be fabricated. Tractable organic polymers are those which can be readily shaped, formed, molded, pressed, cast, etc., into desired articles from the organic polymeric material or from solution after completion of the polymerization reaction of the liquid state, i.e. either from the melt, fluid glassy state or from solution.

SUMMARY OF THE INVENTION

I have invented a p-type electroactive polymeric material comprising a dopant modified organic polymer whose room temperature electrical conductivity is controlled in a highly selective and reversible manner. An electroactive polymer is defined as a polymer having a conductivity which has been modified with electron acceptor or donor dopants to be greater than the conductivity of the virgin state of the polymer. The electroactive organic polymeric material is fabricated from a virgin polymer, which in itself is completely solution processable and which exhibits excellent thermal stability as well as being highly stable to chemical degradation, by modifying the polymer with a conductivity modifier, i.e. electron acceptor dopants. The p-type electroactive organic polymeric material is comprised of recurring units of a fused 6,6,6-membered nitrogen-containing unsaturated phenoxazine ring system and a charge compensating ionic dopant. The recurring units are phenoxazine diradicals. A diradical is defined as a repeat unit of the polymer molecule that has two unsatisfied positions available for linking into the polymer chain. The diradicals are directly linked to one another through the nitrogen atom and a carbon atom on one of the carbocyclic rings. Alternatively, the diradical may be connected to one another via connecting units. A "connecting unit" is defined as any atom or group of atoms which can link the hereinabove diradicals together into a polymer chain. The connecting unit must be conjugated or maintain the pi orbital overlap with the heterocyclic ring system.

A p-type electroactive organic polymer is obtained by reacting the virgin polymer with oxidizing electron acceptor dopants. Electron acceptor dopants induce p-type conductivity in the polymer by oxidizing the polymer to a polycation and the dopant is reduced to a charge neutralizing anion. The resulting electroactive polymer consists of a charged polymer backbone incorporating charge-compensating ionic dopants. The charges of the polymer and the charge compensating ionic dopants balance so that the electroactive polymer is electrically neutral. Furthermore, the oxidation proceeds solely by an electron transfer.

Alternatively, the polymers can be oxidized or reduced to their electroactive or conductive forms using electrochemical techniques. In this method, herein referred to as electrochemical doping, the polymer is immersed in a suitable electrolyte solution and used as one electrode of an electrochemical cell. Upon passing an electric current through such a cell the polymer becomes oxidized and charge compensating anionic dopants from the supporting electrolyte become incorporated into the polymer.

The desired value of the room temperature electrical conductivity of the dopant modified electroactive organic polymer is preselected by controlling the level of incorporation of the dopants into the virgin polymer. A sufficient concentration is defined to be that concentration which when associated with the polymer, effects a significant increase in the conductivity, i.e. on the order of about 10% or greater. Alternatively, the desired value of the room temperature electrical conductivity of the dopant modified electroactive organic polymer is preselected by controlling the length of the reaction time between the virgin polymer and dopants.

The highly selective and reversible modification of the electrical conductivity of the dopant containing organic polymeric material together with the processability of the virgin polymer is highly desirable in that the fabrication of useful articles and devices such as primary and secondary batteries, photovoltaic devices. Furthermore, the materials described in this invention can be utilized as active components in such devices and articles as electrochromic displays and photolithographic processes.

DETAILED DESCRIPTION OF THE INVENTION

The electroactive organic polymers are fabricated from the modification of processable virgin phenoxazine polymers with suitable charge compensating ionic dopants. The polymers are composed of repeating diradical units derived from phenoxazine. The recurring units can be substituted on the carbocyclic rings with one or more substituents to adjust either the electrical or morphological properties of the polymers fabricated therefrom. Suitable examples of substituents are the halogens, lower alkyl groups, lower alkoxy, aryl, and the like. The recurring units can be interspersed with one or more connecting units such as aryl, substituted aryl, alkenyl, thioalkenyl, thioaryl, diaryl ethers, diaryl sulfides, and the like. Preferred connecting units are phenylene and biphenylene. The connecting units can be the same or different between adjacent recurring units in the polymer chain.

The recurring diradical units of the substituted or unsubstituted phenoxazine can be linked through the nitrogen atom (5 position) and one of the unsaturated carbon atoms on the carbocyclic rings at the 1, 2, 3, 4, 6, 7, 8 and 9 positions. Connections at the 5,8 and 2,5 positions in the polymer are preferred. The ring system numbering is illustrated as follows for a preferred 5,8 structure:

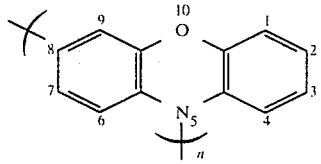

wherein n is from 2 to 1,000 and preferably from 5 to 100.

The polymer can be a homopolymer of the diradicals and the substituted derivatives thereof or a copolymer of the diradicals. A homopolymer is defined as a polymer comprising the same recurring diradical. A copolymer is defined as a polymer comprising different diradicals. In addition, the polymer is a copolymer if the same or different recurring diradicals are interspersed with connecting units.

The association of the polymer in its oxidized polycationic state with anionic dopants produces an electroactive polymer with p-type conductivity. Suitable negatively charged compensating dopants, i.e. anionic dopants, can be preferably an anion such as $AsF_4^-$, $AsF_6^-$, $ClO_4^-$, $PF_6^-$, $SO_3CF_3^-$, $BF_4^-$, $NO_3^-$, $POF_4^-$, $CN^-$, $SiF_5^-$, $SbCl_6^-$, $SbF_6^-$, $HSO_4^-$, $F^-$, $Cl^-$, $Br^-$, $I^-$, $I_3^-$, organic anions ions such as $CH_3CO_2^-$, (acetate), $C_6H_5CO_2^-$ (benzoate), $CH_3C_6H_4SO_3^-$ (tosylate), and the like. Mixtures of the charge-compensating dopants can be employed.

The electroactive polymers of the invention have the following formula:

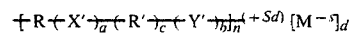

where a is either 0 or 1; b is either 0 or 1; c is either 0 or 1; n is an integer between 1 and 1,000; d is an integer between 1 and 2,000; S is an integer 1, 2, or 3; R is either an unsubstituted or substituted fused nitrogen-containing 6,6,6-membered heterocyclic diradical ring system of phenoxazine; R' is identical to or different from R; X' is a connecting unit comprising a single atom, or a group of atoms; Y' is a connecting unit which is identical to or different from X'; and M is an atom or a group of atoms acting as a charge-compensating anionic dopant whose electrical charge is opposite to the charge exhibited by the recurring repeat units of the polymer backbone:

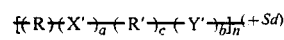

The repeat units form the polycation of the electroactive polymer.

The diradical R group is a substituted or unsubstituted phenoxazine. More specifically, R and R' are unsubstituted or substituted diradicals previously recited or mixtures of diradicals which are linked to one another either directly or via the connecting units X' and Y' by forming bridges.

Preferably the bridges are formed at the 5,8 or 2,5 positions.

A preferred R or R' is selected from the group consisting of the 5,8 or 2,5 diradicals. The 5,8 diradical is illustrated as follows:

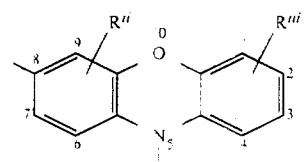

wherein $R^{ii}$ and $R^{iii}$ is from 1–3 substituents or from 1–4 substituents, respectively, which are independently selected from H; disubstituted amino; alkyl of 1 to 4 carbon atoms; alkoxy of 1 to 4 carbon atoms; an alkylthio of 1 to 4 carbon atoms; a cycloaliphatic group of 5 or 6 carbon atoms; an aryl group of 6 to 10 carbon atoms; an aryl group of 6 to 10 carbon atoms substituted by 1 to 3 alkyl groups of 1 to 4 carbon atoms, alkoxy groups of 1 to 4 carbon atoms, 1 to 3 cyano groups, 1 to 3 halogen atoms, dialkyl amino groups of 1 to 4 carbon atoms, an alkylthiol of 1 to 4 carbon atoms; or a 5- or 6-member nitrogen-containing unsaturated heterocyclic group. Of course if the diradical is a 2,5 diradical, then $R^{ii}$ is from 1 to 4 substituents and $R^{iii}$ is from 1 to 3 substituents.

The term "alkyl" refers to both straight- and branched-chain alkyl groups. Suitable examples are methyl, ethyl, propyl, isopropyl, butyl, i-butyl, s-butyl, and t-butyl.

The term "alkoxy" refers to the group $R^1O-$ wherein $R^1$ is alkyl. Suitable examples are methoxy, ethoxy, propoxy, isopropoxy, butoxy, i-butoxy, s-butoxy, and t-butoxy.

The term "alkylthio" refers to such examples as methylthio, ethylthio, propylthio, isopropylthio, butylthio, i-butylthio, t-butylthio, and s-butylthio.

Suitable examples of cycloaliphatic are cyclopentyl, cyclohexyl, 3-methylcyclopentyl, and the like.

The term "aryl" refers to an aromatic hydrocarbon radical such as phenyl, naphthyl, and the like. Suitable examples of an aryl substituted with an alkyl are 2-tolyl, mesityl, 3-isopropylphenyl and the like. Suitable aryl groups substituted with an alkoxy are 1-methoxy-2-naphthyl, 3-n-butoxyphenyl, and the like. Suitable aryl groups substituted with a cyano group are 4-cyanophenyl, 4-cyano-1-naphthyl, and the like. Suitable examples of an aryl with a halogen are 4-fluorophenyl, 3-chloro-4-bromo-1-naphthyl, and the like. Suitable examples of an aryl substituted with a dialkyl amino are 3-dimethylaminophenyl, 6-diethylamino-2-naphthyl, and the like. Suitable examples of an aryl substituted by an alkylthio are 4-butylthiophenyl, 3-methylthio-2-naphthyl, and the like. Suitable examples of 5- or 6-member nitrogen-containing heterocyclic groups are 3-pyrrolyl, 4-pyridyl, and the like. Suitable examples of substituted phenoxazines are the diradicals of 4,8 dimethylphenoxazine; 3,6 diethoxyphenoxazine; 1-methyl-7-phenylphenoxazine; 2-methylthio-3,7-dimethylphenoxazine, and the like.

A preferred substituted 2,5 diradical has the formula:

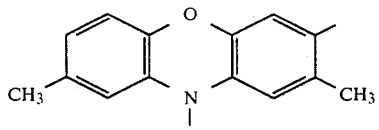

Another preferred substituted 5,8 diradical has the formula:

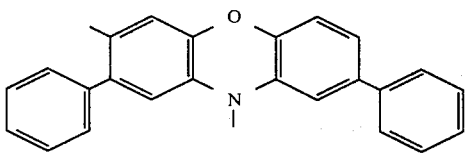

The connecting units X' and Y' can be selected from the group comprising:

—CH=CH—; —C≡C—; —CH=CH—CH=CH—;

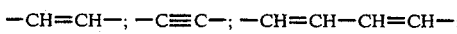

—CH=CH—S—CH=CH—;

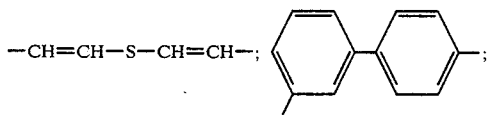

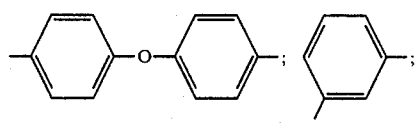

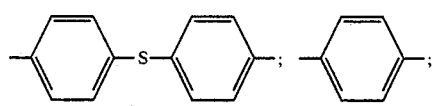

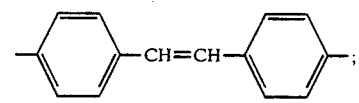

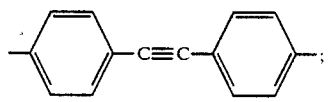

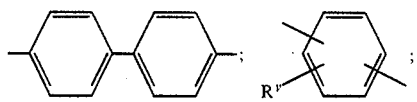

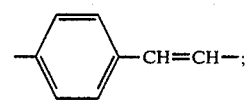

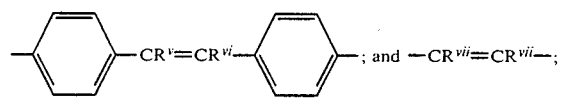

wherein $R^v$, $R^{vi}$ and $R^{vii}$ are H or methyl, methoxy, halogen and mixtures thereof. Biphenylene, vinylene, and phenylene connecting groups are preferred connecting units. An example of a preferred diradical plus a connecting unit has the formula:

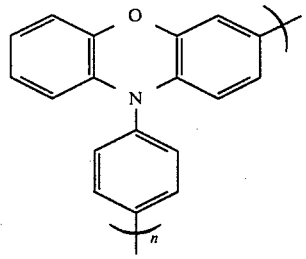

The size of n determines the physical properties of the electroactive polymer n is from 1 to 1,000. Preferably, n is from 2 to 500. Most preferably, n is from 5 to 100 when b and c are zero. Molecular weights of the polymer are between 350 and 500,000. A preferred molecular weight is 10,000 or greater.

The enhancement in conductivity of the electroactive polymer above the conductivity of polymer in the virgin state is determined by d. The value for d is not greater than 2n. The conductivity is increased and adjusted by increasing d. Conductivities in the semiconductor region can generally be achieved with d values of about 5 percent the n value.

More specifically, the virgin polymer, polyphenoxazine, has a conductivity of about $10^{-14}$ ohm$^{-1}$ cm$^{-1}$. Exposure of the polymer to 1 torr of SbCl$_5$ vapor in argon results in measured conductivity of about $1.5 \times 10^{-7}$ ohm$^{-1}$ cm$^{-1}$. Preferred electroactive polymers have conductivities greater than about $1 \times 10^{-10}$ ohm$^{-1}$ cm$^{-1}$.

When a and c are 1 and b is zero, Y' drops out and the polymer has the formula:

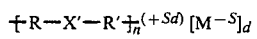

When a is zero and b and c are 1, X' drops out and the polymer has the formula:

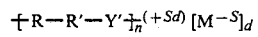

A preferred electroactive polymer has the formula:

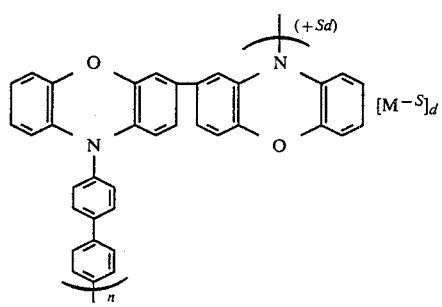

This polymer is prepared by the reductive coupling of 5,5'bis(p-bromophenyl)-2,2'-biphenoxazine.

When a is 1, and b and c are zero, R' and Y' drop out and the polymer has the following formula:

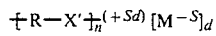

An example of a preferred electroactive polymer is poly 2,5-(1,4-phenylene phenoxazine):

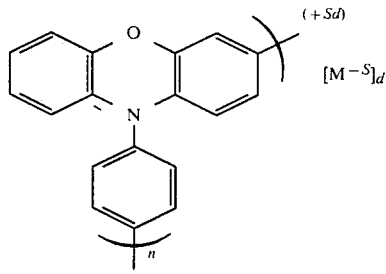

This polymer is prepared by the reductive coupling of 2-bromo-5-(4'-bromophenyl)-phenoxazine.

When a, b, and c are zero, R', X', Y' drop out and the polymer has the formula:

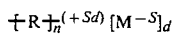

Preferred polymers of this formula are substituted or unsubstituted poly(-5,8- or -2,5-)phenoxazines of the formulas:

Poly 5,8 phenoxazine:

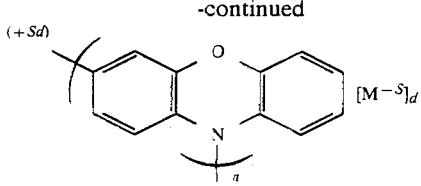

Poly 2,5 phenoxazine:

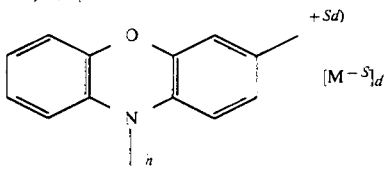

Poly 2,5-(3,7-dimethyl)-phenoxazine:

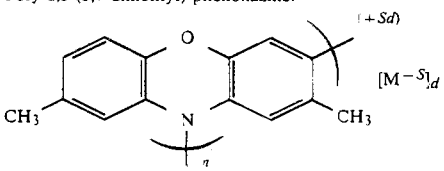

Poly 5,8-(3,7-diphenyl)-phenoxazine:

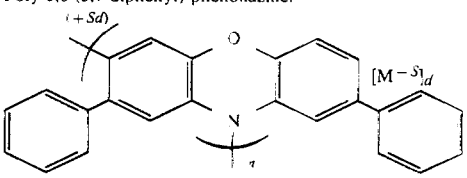

For the above polymers, the 2,5 and 5,8 positions are equivalent.

Polymer Fabrication

The starting material for preparing the electroactive polymers of this invention are polymers and copolymers comprising recurring units of substituted or unsubstituted phenoxazine. These polymers and copolymers are well known materials having been synthesized in a variety of ways. The polymers without connecting units, i.e. comprising solely phenoxazine and substituted phenoxazine diradicals, are typically prepared by an oxidative coupling of phenoxazine or substituted phenoxazines, respectively. For example, see Musso, *Chem. Berichte*, 92, 2862 (1959), completely incorporated herein by reference.

Tractable Polymer Fabrication

Subsequent to polymerization, articles such as fibers, ribbons, or free-standing films are cast from solution. The solution is formed by dissolving the desired polymer in a solvent which consists of sulfuric acid, formic acid, methane sulfonic or polyphosphoric acid. The solution temperature is from about 10° C. to about 200° C. The polymers are coagulated into solid shapes such as fibers, ribbons, or free-standing films in a basic coagulation bath. For free-standing films, the polymers are fabricated from solutions containing about 2 to 25% polymer dissolved in the solvent. At concentrations which exceed 10%, the cast films take on an anisotropic morphology. The anisotropic property enhances the conductivity in the anisotropic direction. An amine, for example triethylamine, dissolved in a protonic solvent such as $H_2O$ and preferably ethyl alcohol comprises the coagulation bath. The bath is maintained at a lower temperature than the dissolution temperature of the polymer in the solvent. Usually room temperature is selected as the operating temperature of the coagulation bath. The fabricated articles are dried. Elevated temperatures, usually 60° C., and reduced pressure accelerate the drying process. Drying is continued until no further weight loss is observed.

Alternatively, films are cast into water, comprising the coagulation bath, followed by neutralization in aqueous bicarbonate. Neutralized films are washed in water and dried at elevated temperatures, 60°–100° C., under reduced pressure.

Alternatively, conductive substrates may be coated with a layer of the phenoxazine polymers by an electrochemical deposition. According to this procedure the virgin polymer is dissolved in an organic solvent containing a suitable electrolyte. Suitable organic solvents are those in which the virgin polymer but not the oxidized (doped) polymer is soluble. The substrate to be coated is immersed in the solution and held at a potential sufficiently positive to oxidize the polymer. The oxidized (doped) polymer precipitates on the substrate, which is removed from the solution when a sufficiently thick layer has built up.

Polymer Conductivity Modification

After fabrication of the desired articles from the polyphenoxazine polymers by means of the procedure described above, the articles are rendered electroactive by, for example, chemical or electrochemical procedures. The articles can be rendered electroactive in an atmosphere which is inert with respect to the polymer and dopant, by contacting them with suitable conductivity modifiers, i.e. dopants. An inert atmosphere is defined as an atmosphere which does not react with the polymer, the dopant, or the electroactive polymer. For example, the atmosphere can be argon, helium, and nitrogen and the like. The doping can also be carried out in an inert liquid medium such as tetrahydrofuran, acetonitrile and the like. The inert liquid medium should be able to wet and swell the polymer but not react with it. The dopants can be oxidizing or electron accepting molecules. The dopants may be in the form of gases or vapors, pure liquids or liquid solutions. Preferably, oxygen and water moisture are excluded during and after the doping process because the conductive polymers tend to degrade, i.e. lose conductivity, when exposed thereto.

For example, the polymer can be contacted with $SbCl_6$ or $AsF_5$ in a pentane solution. The conductivity modifier concentration can be from about 0.001 to about 1 molar and preferably from about 0.01 to about 0.5 molar in the pentane or other suitable solvent. Alternative doping methods are taught in U.S. Pat. No. 4,204,216 and incorporated herein by reference.

The incorporation of the dopants into the polymer can be observed by a color change in the polymer as well as an enhanced conductivity. For example, a virgin polymer film having a grey, white, or light brown color, changes to a blue or black color with a metallic luster upon doping and the measured conductivity increases by many orders of magnitude.

Alternatively, the polymers can be oxidized to their conductive forms using electrochemical techniques. In this method, herein referred to as electrochemical doping, the polymer is immersed in a suitable electrolyte solution and used as one electrode of an electrochemical cell. Upon passing an electric current through such a cell the polymer becomes oxidized and charge-compensating anions from the supporting electrolyte become incorporated into the polymer. This doping also proceeds with the characteristic color change described above. Thus, the polymer can be electrochemically doped with whatever appropriately charged ion is present in the electrolyte solution. Electrolyte solutions are comprised of a salt dissolved in a solvent. Suitable solvents are acetonitrile, tetrahydrofuran, 2-methyl-tetrahydrofuran, propylene carbonate, dimethylformamide, dimethylsulfoxide and the like. Alternative electrolytes are specified in U.S. application Ser. No. 334,509, filed Dec. 28, 1981, entitled "Batteries Fabricated With Electroactive Polymers", and completely incorporated herein by reference. Suitable anions are $Cl^-$, $Br^-$, $ClO_4^-$, $BF_4^-$, and $PF_6^-$ and the like. The extent of doping can be easily controlled by adjusting the amount of charge electrochemically injected into the polymer, either by controlling the magnitude of the current used (galvanostatic charging) or by controlling the potential of the polymer electrode with respect to a reference electrode (potentiostatic charging).

The above-described electrochemical doping process is completely reversible. The polymer can be "undoped" and returned to its original, neutral, non-conducting state simply by applying a current opposite in sign to that used for the doping process. Upon complete undoping the color of the polymer reverts back to its original color. Thus, for example an oxidized conducting polyphenoxazine can be reduced completely to its neutral, non-conducting form, and the charge-compensating anions incorporated during the electrochemical oxidation process are expelled from the article during electrochemical reduction.

Having described the methods of fabrication and the basic conductive polymer systems, the following examples are intended to be illustrative of the invention and not meant to limit the scope thereof. Modification which would be obvious to one of ordinary skill in the art are contemplated to be within the scope of the invention.

EXAMPLES

EXAMPLE 1

Preparation of Poly 2,5-phenoxazine 1.70 gm of phenoxazine (commercial) was dissolved in 50 ml of pure, dry acetone. The solution was cooled in an ice bath and a saturated solution of potassium permanganate in acetone was added dropwise. The purple permanganate color was discharged rapidly at first, then more slowly. During the addition, solids precipitated consisting of manganese dioxide and the polyphenoxazine. When the purple color persisted for 15 minutes, addition was discontinued and the precipitate filtered and washed with acetone. After air drying, the solids were suspended in hot toluene and the insoluble manganese dioxide removed by filtration. The filtrate was evaporated to dryness and the crude polyphenoxazine purified by twice dissolving it in toluene and reprecipitating it with methanol. After purification, 1.1 gm (65% yield) of a light gray powder, readily soluble in toluene or tetrahydrofuran was obtained.

This polymer has the formula:

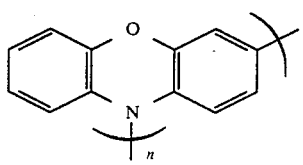

This preparation follows the method reported by Musso, *Chem. Berichte*, 92, 2862 (1959), completely incorporated herein by reference.

EXAMPLE 2

Simultaneous Deposition and Doping of Poly 2,5-phenoxazine of Example 1

55 mg of poly 2,5-phenoxazine of Example 1 was dissolved in 60 ml of 0.5M lithium perchlorate in dry tetrahydrofuran. A 1.5 cm×5 cm×0.5 cm block of reticulated vitreous carbon (100 pores per inch, Normar Industries) was placed in the solution as a working electrode. A platinum wire counter electrode was isolated from the solution via a porous glass frit. The working electrode was held at +0.775 volts vs. a silver/silver chloride reference.

The initially pale brown solution rapidly became the dark violet color of the phenoxazine radical cation. After passing 32 Coulombs of charge (110% of theory), the solution was very pale violet. The working electrode was removed from the cell and rinsed with tetrahydrofuran. The dark deposit of oxidized (p-doped) poly phenoxazine adheres well to the carbon surface and it is not rinsed off with tetrahydrofuran or acetonitrile.

When the electrode coated in this manner is placed in a solution of 0.1M tetraethylammonium tetrafluoroborate in acetonitrile, the poly phenoxazine film may be repeatedly cycled between its oxidized and reduced states by applying to it potentials of about +1.0 volts and about 0 volts, respectively, vs. silver/silver chloride electrode. In this manner, the electrode takes up 19.0±0.3 Coulombs of charge.

EXAMPLE 3

Electrochemical Doping of the Polymer of Example 1

In a similar manner, films of poly phenoxazine were deposited on smooth platinum electrodes. A platinum disc (0.35 cm² area) required 1.9 Coulombs for deposition and then would repeatedly take up a charge of about 0.58±0.03 Coulombs.

EXAMPLE 4

Chemical Doping and Conductivity Measurement

The purified poly 2,5-phenoxazine of Example 1 was placed in a steel die and subjected to a pressure of 5,000 psi at a temperature of 220°-250° C. A brittle, dark grey pellet was obtained. Before doping, the conductivity of this pellet was measured to be $10^{-13}$–$10^{-14}$ S/cm. Exposure of the pellet to 1 torr of $SbCl_5$ in argon for 2 days resulted in a darkening of the pellet to a blue-black color. The weight gain corresponded to a 1-2% level of doping. Conductivity of the doped pellet was $1.5-3\times10^{-7}$ S/cm.

EXAMPLE 5

A pellet of undoped poly phenoxazine as prepared in Example 4 was exposed to 1 torr of $AsF_5$ on a vacuum line. The initially grey pellet darkened to a blue-black, and the conductivity increased from $10^{-13}$ S/cm to $3-4\times10^{-7}$ S/cm.

EXAMPLE 6

Preparation of Poly 2,5-(3,7-dimethyl)phenoxazine

The polymer was prepared according to Example 1, except that the starting material was 3,7,-dimethylphenoxazine.

EXAMPLE 7

Simultaneous Deposition and Doping of The Polymer of Example 6

The polymer of Example 6 was deposited on a vitreous carbon electrode and doped in accordance with the procedure of Example 2. The results were similar.

What is claimed is:

1. A p-type electroactive polymer which comprises a charged polymer backbone of recurring units of a substituted or unsubstituted phenoxazine and a sufficient concentration of a charge-compensating anionic dopants associated therewith, wherein said polymer backbone is capable of undergoing reversible oxidation to said charged polymer backbone and said substituted phenoxazine contains from 1 to 3 substituents on the carbocyclic ring which links into the polymer backbone and from 1 to 4 substituents on the carbocyclic ring adjacent to the central ring containing the nitrogen atom which links into the polymer backbone wherein the substituents are independently selected from H; alkyl of 1 to 4 carbon atoms; alkoxy of 1 to 4 carbon atoms; an alkylthio of 1 to 4 carbon atoms; a cycloaliphatic group of 5 or 6 carbon atoms; an aryl group of 6 to 10 carbon atoms; an aryl group of 6 to 10 carbon atoms substituted by 1 to 3 alkyl groups of 1 to 4 carbon atoms, alkoxy groups of 1 to 4 carbon atoms, 1 to 3 cyano groups, 1 to 3 halogen atoms, dialkylamino groups of 1 to 4 carbon atoms, an alkylthio of 1 to 4 carbon atoms; and a 5- or 6-membered nitrogen-containing unsaturated heterocyclic group.

2. The electroactive polymer according to claim 1 wherein the recurring units are unsubstituted phenoxazine units connecting at the 2,5 or 5,8 positions.

3. The electroactive polymer according to claim 2, wherein the charge-compensating ionic dopant is an anion selected from the group consisting of $AsF_4^-$, $AsF_6^-$, $ClO_4^-$, $PF_6^-$, $SO_3CF_3^-$, $BF_4^-$, $NO_3^-$, $POF_4^-$, $SiF_5^-$, $SbCl_6^-$, $SbF_6^-$, $HSO_4^-$, acetate, benzoate, tosylate, or mixtures thereof.

4. The electroactive polymer according to claim 3 wherein the polymer backbone has a molecular weight greater than 350.

5. The electroactive polymer according to claim 1 wherein the phenoxazine units are connected at the 2,5 or 5,8 positions and substituted at the 3 and 7 positions.

6. The electroactive polymer according to claim 5 wherein the substituents are methyl groups.

7. The electroactive polymer according to claim 6, wherein the charge-compensating ionic dopant is an anion selected from the group consisting of $AsF_4^-$, $AsF_6^-$, $ClO_4^-$, $PF_6^-$, $SO_3CF_3^-$, $BF_4^-$, $NO_3^-$, $POF_4^-$, $SiF_5^-$, $SbCl_6^-$, $SbF_6^-$, $HSO_4^-$, acetate, benzoate, tosylate, or mixtures thereof.

8. The electroactive polymer according to claim 7 wherein the polymer backbone has a molecular weight greater than 420.

9. An electroactive polymer which comprises a charged polymer backbone and charge-compensating ionic dopants associated therewith of the formula:

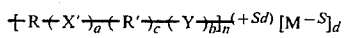

wherein a is 0 or 1; b is 0 or 1; c is 0 or 1; n is an integer from 2 to 1,000; d is an integer from 1 to 2,000; s is an integer 1, 2 or 3; R is the phenoxazine diradical; R' is the same as R or a different phenoxazine diradical; X' is a connecting unit; Y' is the same connecting unit as X' or a different connecting unit; and M is a charge-compensating anionic dopant, wherein said X' or Y' connecting unit is selected from the group consisting of:

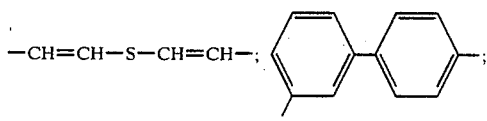

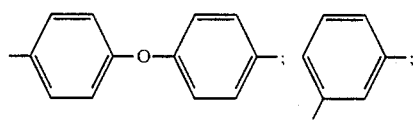

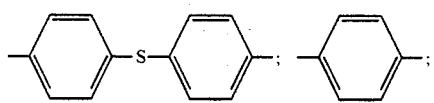

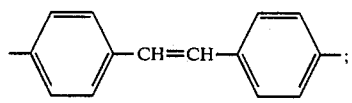

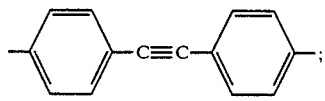

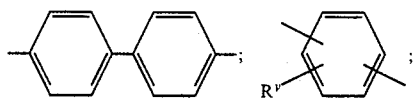

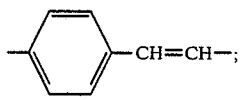

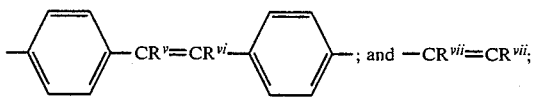

wherein $R^v$, $R^{vi}$ and $R^{vii}$ are H or methyl, methoxy, halogen and mixtures thereof.

10. The electroactive polymer according to claim 9 wherein R and R' are diradicals of the formula:

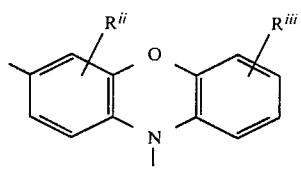

wherein $R^{ii}$ and $R^{iii}$ are from one to three substituent groups independently selected from H; alkyl of 1 to 4 carbon atoms; alkoxy of 1 to 4 carbon atoms; an alkylthio of 1 to 4 carbon atoms; a cycloaliphatic group of 5 or 6 carbon atoms; an aryl group of 6 to 10 carbon atoms; an aryl group of 6 to 10 carbon atoms substituted by 1 to 3 alkyl groups of 1 to 4 carbon atoms, alkoxy groups of 1 to 4 carbon atoms, 1 to 3 cyano groups, 1 to 3 halogen atoms, dialkyl amino groups of 1 to 4 carbon atoms, an alkylthiol of 1 to 4 carbon atoms; a 5- or 6-member nitrogen-containing unsaturated heterocyclic group.

11. The electroactive polymer according to claim 10 wherein a, b and c are zero, and the polymer has the formula:

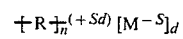

12. The electroactive polymer according to claim 11 wherein the polymer has the formula:

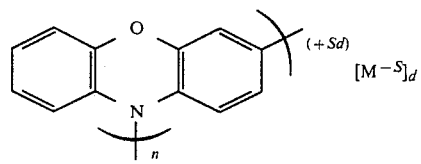

13. The electroactive polymer according to claim 12 wherein the charge-compensating anionic dopant M is an anion selected from the group consisting of $AsF_4^-$, $AsF_6^-$, $ClO_4^-$, $PF_6^-$, $SO_3CF_3^-$, $BF_4^-$, $NO_3^-$, $POF_4^-$, $SiF_5^-$, $SbCl_6^-$, $F^-$, $Br^-$, $Cl^-$, $I^-$, $I_3^-$, $SbF_6^-$, $HSO_4^-$, acetate, benzoate, tosylate, or mixtures thereof.

14. The electroactive polymer according to claim 13 wherein n is from 2 to 500.

15. The electroactive polymer according to claim 11 wherein the polymer has the formula:

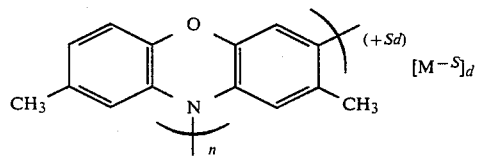

16. The electroactive polymer according to claim 15 wherein the charge-compensating anionic dopant M is an anion selected from the group consisting of $AsF_4^-$, $AsF_6^-$, $ClO_4^-$, $PF_6^-$, $SO_3CF_3^-$, $BF_4^-$, $NO_3^-$, $POF_4^-$, $SiF_5^-$, $SbCl_6^-$, $F^-$, $Br^-$, $Cl^-$, $I^-$, $I_3^-$, $SbF_6^-$, $HSO_4^-$, acetate, benzoate, tosylate, or mixtures thereof.

17. The electroactive polymer according to claim 11 wherein the polymer has the formula:

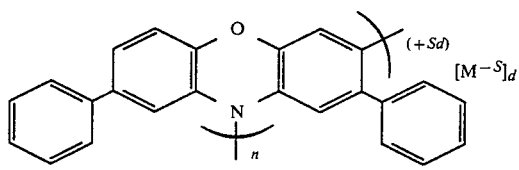

18. The electroactive polymer according to claim 17 wherein the charge-compensating anionic dopant M is an anion selected from the group consisting of $AsF_4^-$, $AsF_6^-$, $ClO_4^-$, $PF_6^-$, $SO_3CF_3^-$, $BF_4^-$, $NO_3^-$, $POF_4^-$, $SiF_5^-$, $SbCl_6^-$, $F^-$, $Br^-$, $Cl^-$, $I^-$, $I_3^-$, $SbF_6^-$, $HSO_4^-$, acetate, benzoate, tosylate, or mixtures thereof.

19. The electroactive polymer according to claim 10 wherein a is 0, b and c are 1, and the polymer has the formula:

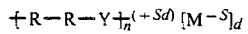

20. The electroactive polymer according to claim 10 wherein a is 1 and b and c are 0 and the polymer has the formula:

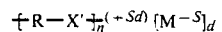

* * * * *